United States Patent
Critelli et al.

(10) Patent No.: US 7,555,845 B2
(45) Date of Patent: Jul. 7, 2009

(54) AUTOMATIC LOCKING TAPE MEASURE

(75) Inventors: James M. Critelli, Fuquay-Varina, NC (US); Lin Ping Lin, Taipei Hsien (TW)

(73) Assignee: Cooper Brands, Inc., Houston, TX (US)

( * ) Notice: Subject to any disclaimer, the term of this patent is extended or adjusted under 35 U.S.C. 154(b) by 189 days.

(21) Appl. No.: 11/778,273

(22) Filed: Jul. 16, 2007

(65) Prior Publication Data

US 2008/0034604 A1 Feb. 14, 2008

Related U.S. Application Data

(60) Provisional application No. 60/821,989, filed on Aug. 10, 2006.

(51) Int. Cl.
*G01B 3/10* (2006.01)
(52) U.S. Cl. .......................... 33/767; 33/761
(58) Field of Classification Search ............... 33/755, 33/759, 760, 761, 767, 768; 242/382, 385.4
See application file for complete search history.

(56) References Cited

U.S. PATENT DOCUMENTS

| | | | |
|---|---|---|---|
| 2,575,354 A | 11/1951 | Mills | |
| 3,164,907 A | 1/1965 | Quenot | |
| 3,675,334 A | 7/1972 | Quenot | |
| 3,737,186 A | 6/1973 | Chezem | |
| 3,812,588 A * | 5/1974 | Bennett | 33/767 |
| 4,121,785 A | 10/1978 | Quenot | |
| 4,153,996 A | 5/1979 | Rutty | |
| 4,194,703 A | 3/1980 | Roe | |
| 4,288,923 A | 9/1981 | Duda | |
| 4,765,557 A | 8/1988 | Kahmann | |
| 4,856,726 A | 8/1989 | Kang | |
| 4,899,460 A | 2/1990 | Kang | |
| 4,927,092 A | 5/1990 | Ingram, II et al. | |
| 5,007,178 A | 4/1991 | Dewire et al. | |
| 5,395,069 A | 3/1995 | Chen | |
| 5,657,551 A | 8/1997 | Lin | |
| 5,791,581 A | 8/1998 | Loeffler et al. | |
| 5,794,357 A | 8/1998 | Gilliam et al. | |
| 6,026,585 A | 2/2000 | Li | |
| 6,256,901 B1 | 7/2001 | Lin | |
| 6,405,451 B1 | 6/2002 | Hsu | |
| 6,431,486 B1 * | 8/2002 | Lee | 33/767 |
| 6,467,182 B2 * | 10/2002 | Usami | 33/767 |
| 6,490,809 B1 | 12/2002 | Li | |
| 6,491,248 B1 | 12/2002 | Liu | |

(Continued)

*Primary Examiner*—Yaritza Guadalupe-McCall
(74) *Attorney, Agent, or Firm*—Coats & Bennett, P.L.L.C.

(57) ABSTRACT

An automatic locking mechanism for use in a power return tape measure includes a user-accessible actuator, a brake element, and a biasing member normally urging the brake element into contact with the tape drum. In a locked position, the brake element wedges against the drum. The actuator displaces inwardly to move the brake element out of contact with the drum. A rotatable coupler/member may convert pivoting motion of the actuator into brake member translation. The coupler may include first and second arms that respectively contact the actuator and the brake element. The coupler may further include a cammed outer surface that contacts the drum in the locked position. The cammed surface rotates out of contact with the drum in the release position. The cammed surface of the rotatable member may be used independently of, or in conjunction with, the brake element. Related methods are also described.

30 Claims, 6 Drawing Sheets

U.S. PATENT DOCUMENTS

| | | |
|---|---|---|
| 6,595,451 B1 | 7/2003 | Kang et al. |
| 6,643,948 B1 | 11/2003 | Seymour |
| 6,836,975 B2 * | 1/2005 | Lin .............................. 33/767 |
| 7,065,896 B1 * | 6/2006 | Lin .............................. 33/767 |
| 7,178,257 B2 * | 2/2007 | Kang et al. ................... 33/761 |
| 7,305,770 B2 * | 12/2007 | Critelli et al. .................. 30/162 |
| 7,444,758 B1 * | 11/2008 | Lin .............................. 33/767 |
| 7,475,842 B2 * | 1/2009 | Campbell ...................... 33/767 |
| 2004/0035017 A1 * | 2/2004 | Yang ............................ 33/767 |
| 2004/0118002 A1 | 6/2004 | Lu |

* cited by examiner

AUTOMATIC LOCKING TAPE MEASURE

This application claims benefit of U.S. Provisional Application No. 60/821,989, filed 10 Aug. 2006, the disclosure of which is incorporated herein by reference.

BACKGROUND

The present invention is directed generally to tape measures (or "tape rules") of the type commonly used to measure linear distances. Conventionally, these devices include a flexible tape blade, with distance markings thereon, that can be extended from a housing to measure linear distances. Generally, the tape blade in these devices is constantly subjected to a retraction bias (e.g., from a retraction spring) for pulling the tape blade back into the housing. As such, modern tape measures typically incorporate some type of locking feature to selectively hold the blade in an extended position. Typically, these features require positive engagement in that they are actuated after the tape blade is extended. In other types of tape measures, the locking feature is automatic. That is, once the tape blade is pulled out to an extended position, the tape blade automatically remains in that position until a release mechanism is actuated to allow the return spring to pull the tape blade back into the housing. These latter types of tape measures are sometimes referred to as "auto-lock" tape measures.

Conventional auto-lock tape measure designs often use a locking mechanism that pinches the tape blade at or near the opening where the tape blade exits the housing. However a pinching force applied to the tape blade imparts friction and undesirable wear on the tape blade. Further, the tape blade is a flexible member and may not provide an optimal braking surface on which to apply a locking force. In addition, the interior of the housing adjacent to the tape blade opening, and thus the locking mechanism, may be susceptible to dirt or foreign object contamination. Accordingly, conventional auto-lock designs may not be ideal in all circumstances. As such, there remains a need for alternative auto-lock locking mechanism designs; advantageously, designs that provide robust and consistent locking forces over extended use.

SUMMARY

In one illustrative embodiment, the tape measure provides an automatic locking mechanism including an externally accessible actuator, a brake, and a biasing member normally urging the brake into contact with the tape drum. The brake may occupy a first locked position in contact with the drum. The actuator may be displaceable towards the interior of the housing to move the brake to a second release position out of contact with the drum.

The locking mechanism may include a rotatable coupler that converts motion of the actuator into brake member motion. The coupler may have first and second arms that contact the actuator and the brake, respectively. In one embodiment, the rotation of the coupler causes the brake to move in a substantially linear direction, into and out of wedged contact with the tape drum. The coupler may optionally or alternatively further include a cammed outer surface that contacts the drum in the locked position, and rotates out of contact with the drum in the release position.

In another illustrative embodiment, the tape measure provides an automatic locking mechanism including an externally accessible actuator, a rotatable member including a cammed outer surface, with the cammed outer surface biased into contact with the tape drum. Inward movement of the actuator causes the rotatable member to rotate, which causes the cammed surface to rotate to a release position out of engagement with the tape drum.

The various aspects of the various embodiments may be used alone or in any combination, as is desired.

DETAILED DESCRIPTION

Figure 1:
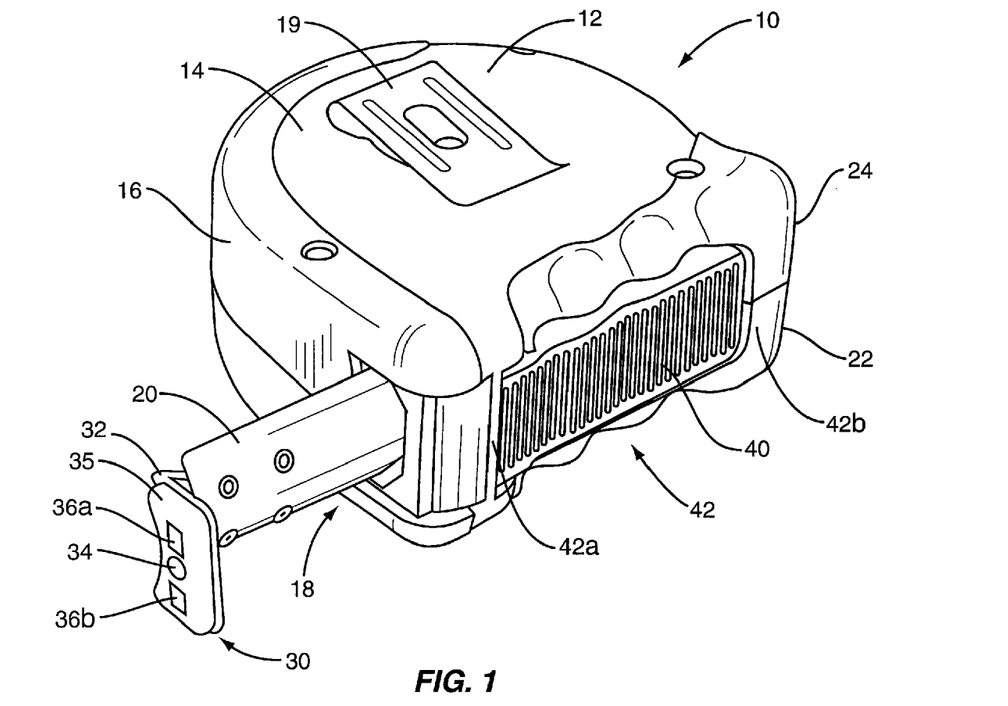
FIG. 1 shows a perspective view of a tape measure incorporating an automatic locking mechanism according to one embodiment.

The various embodiments disclosed herein are directed to a tape measure including an auto-lock function. As illustrated in FIG. 1, a tape measure, generally designated 10, is shown constructed according to one embodiment. The tape measure 10 includes a housing 12, a coilable measuring tape blade 20, and an end hook assembly 30. The housing 12 includes an opposing pair of sidewalls 14 and an interconnecting peripheral wall 16 which help define an internal chamber (not labeled) that houses the coiled portion of the tape 20. The housing 12 typically has a generally squarish shape with rounded corners, but any shape known in the art may be employed, and is preferably sized to fit within a user's hand and/or conveniently stored on a work belt or in a toolbox. The housing 12 may be formed by two mating shells 22, 24, each including a respective sidewall 14 and a portion of the interconnecting peripheral wall 16. The housing 12 houses, among other items, a suitable tape-biasing device (e.g., retraction spring 45) and portions of the blade auto-locking mechanism 50 described in greater detail below. The housing 12 typically includes an opening 18 near its lower-front corner that connects to the internal chamber. The distal end of the tape 20 extends through this opening 18 for selective deployment therefrom. A belt clip 19 may be attached to a side of the housing 12 and may take any form known in the art, such as the conventional modified "R" shape well known in the art. As the general design and operation of power-return tape measures are well known in the art, additional detailed discussion thereof is omitted herein for brevity. However, additional discussion may be found in U.S. Pat. Nos. 4,976,048 and 6,718,649, and U.S. Patent Application Publication 2003/0233762, which are incorporated herein by reference.

The end hook assembly 30 may include a hook member 32 that extends downward in a direction substantially perpendicular to the tape blade 20. Conventional end hooks serve several functions such as allowing users to pull the tape blade 20 from the housing 12 and engaging the end of a surface while measuring a workpiece. In the illustrated embodiment, the end hook assembly 30 further comprises a magnetic structure such as that disclosed in commonly assigned U.S. patent application Ser. No. 11/243,197, filed Oct. 4, 2005, the contents of which are incorporated herein by reference. The exemplary tape end hook assembly 30, or simply end hook, includes a hook member 32, a bezel 35, one or more magnets 36a, 36b, and a fastener 34. The fastener 34 secures the bezel 35 to the hook member 32 and further secures the magnets 36a, 36b between the bezel 35 and the hook member 32. The magnetic structure provides flexibility in attaching the end hook assembly 30 to a measurement surface via magnetic and/or mechanical means.

Figure 3:
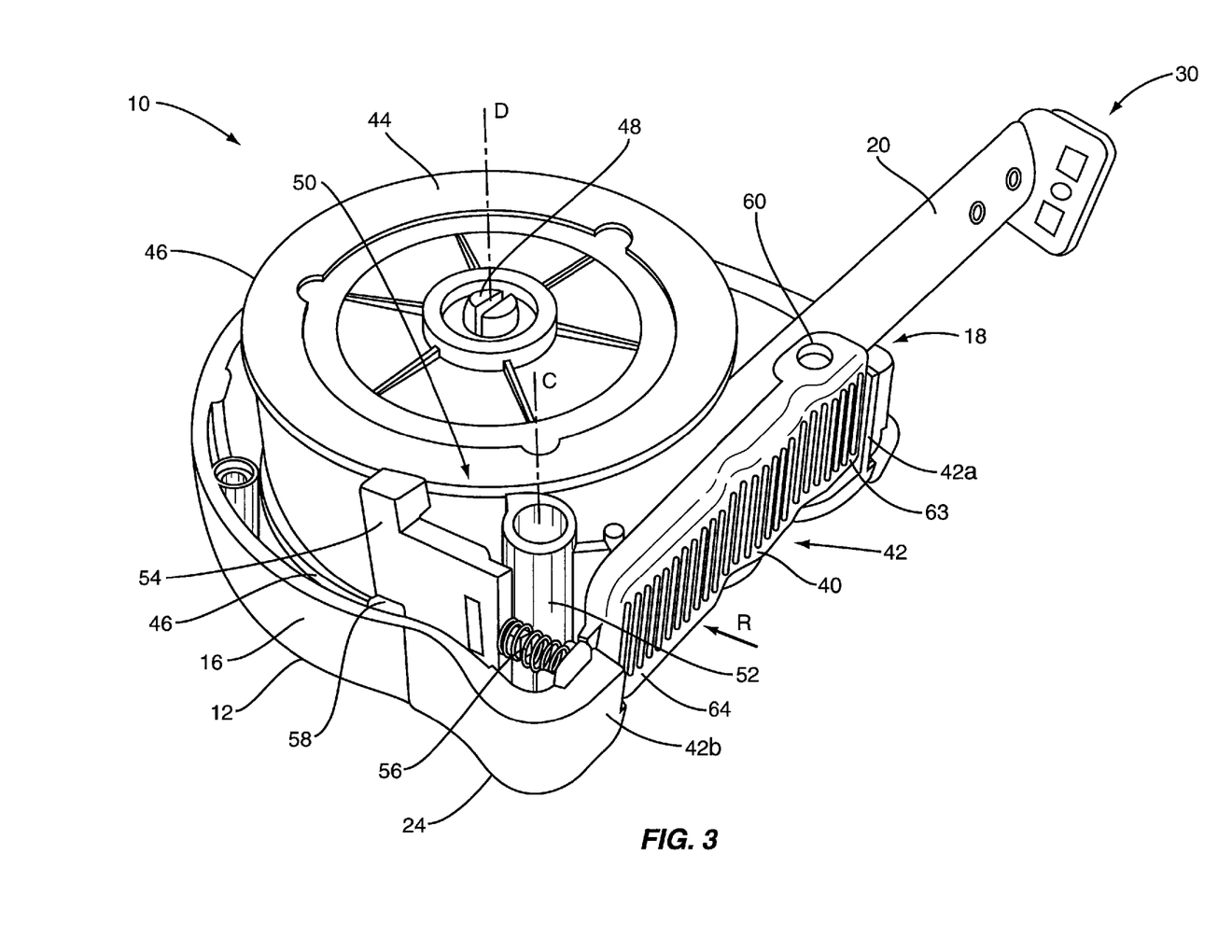
FIG. 3 shows a perspective view of the interior of the tape measure of FIG. 1.

As suggested above, the tape measure 10 includes an autolocking mechanism 50, one embodiment of which is shown in FIG. 3. As suggested above, the locking mechanism 50 automatically holds the tape blade 20 in an extended position when the tape blade 20 is pulled from the housing 12. The locking mechanism 50 illustrated in FIG. 3 includes an actuator 40, a coupler 52, and a brake 54. The actuator 40 can be pushed inward relative to the housing 12 by a user to retract the tape blade 20. When actuator 40 is pushed inward by the user, actuator 40 rotates coupler 52 about pivot axis C, which in turn releases brake 54. Additional details regarding the operation of locking mechanism 50 are provided below. Notably, locking mechanism 50 is disposed towards the rear of housing 12, away from opening 18 and away from dirt that may enter opening 18. Further, this rearward location of locking mechanism 50 avoids undesirable interference with tape motion and/or shock absorption mechanisms (not shown) that may be disposed near opening 18.

Figure 2:
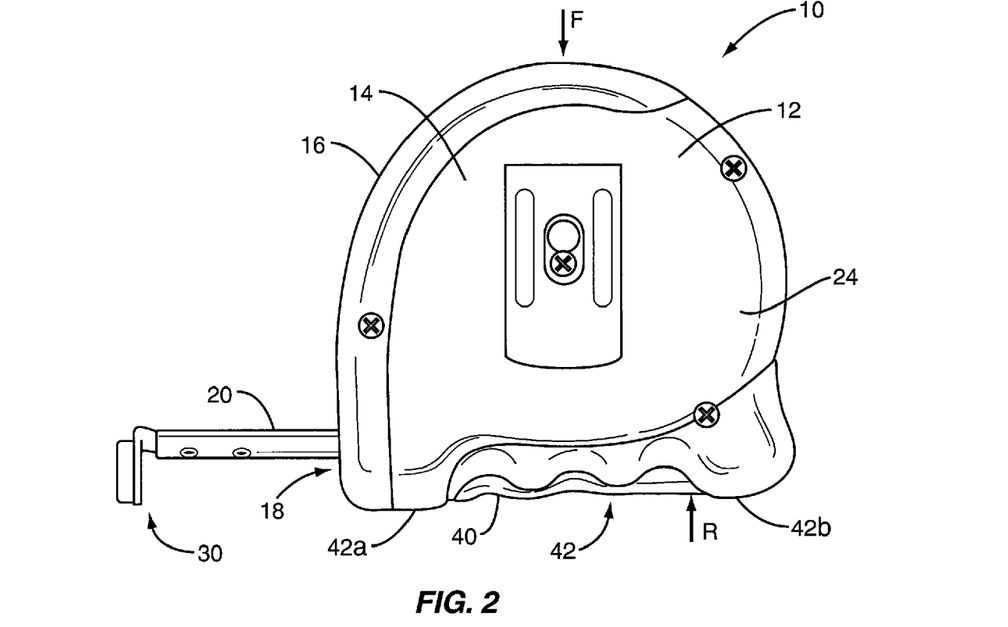
FIG. 2 shows a side view of the tape measure of FIG. 1.

The actuator 40 is disposed towards bottom 42 of the tape measure 10. FIG. 2 further illustrates that the actuator 40 is recessed relative to surfaces 42a, 42b that help form the bottom 42 of the tape measure 10. That is, if the tape measure 10 is placed at rest upon a surface such as a table or bench, the tape measure 10 will rest upon surfaces 42a, 42b because these surfaces protrude the furthest in the "bottom" direction. Furthermore, if the tape measure 10 is positioned with surfaces 42a, 42b resting on a substantially flat work surface, a downward force applied to the housing 12 in the direction of the arrow labeled F will not inadvertently cause the tape blade 20 to retract into the housing 12. Instead, a localized displacement force applied to the actuator 40 in the direction of arrow R causes the tape blade 20 to retract into the housing 12. A user can apply this release force R with their fingers, which may be optimally positioned on or proximate to actuator 40 when the user grasps the tape measure 10 in a conventional manner.

Figure 4:
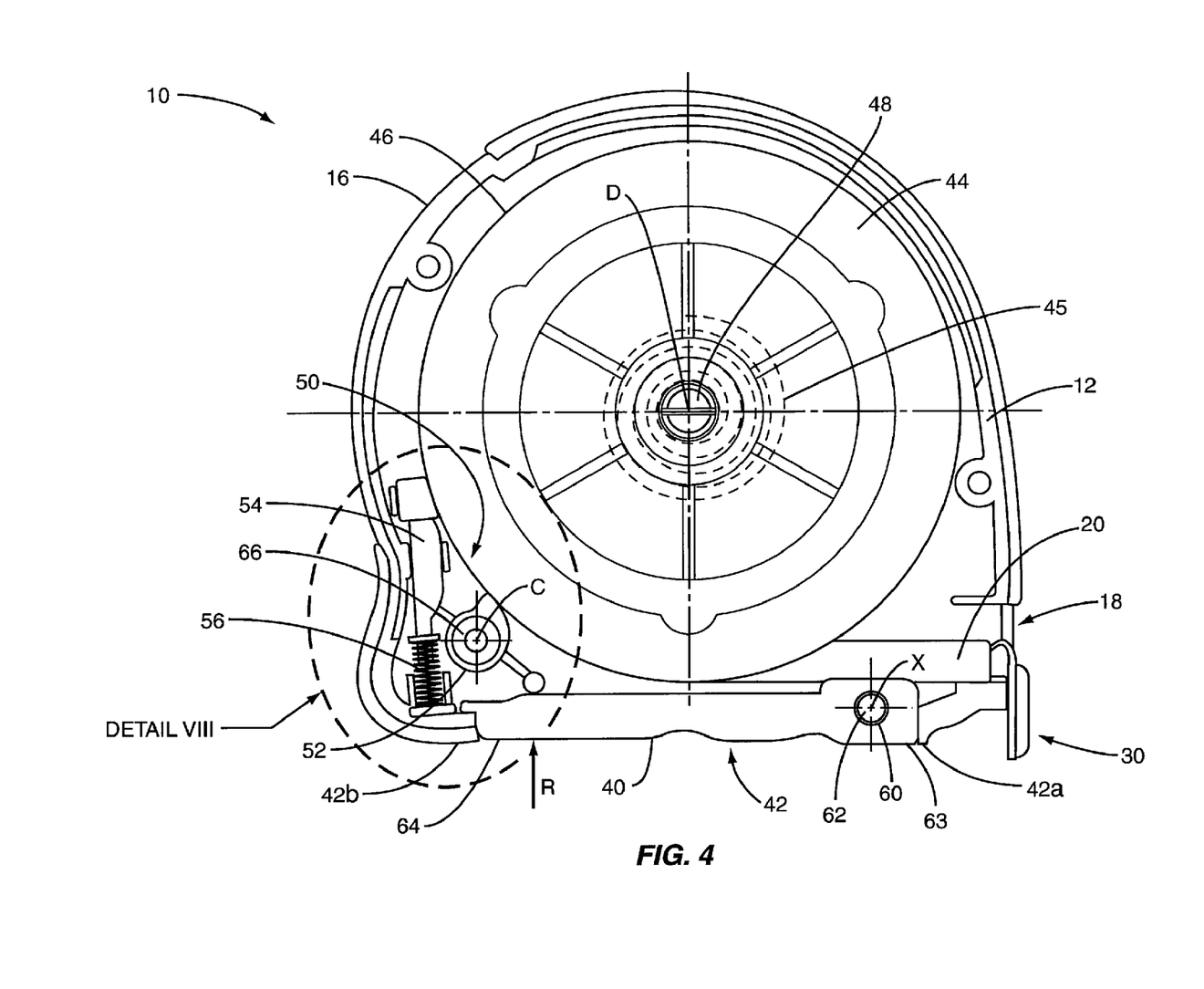
FIG. 4 shows a side view of the tape measure of FIG. 1 with a shell portion removed to expose the interior thereof.
Figure 8A:
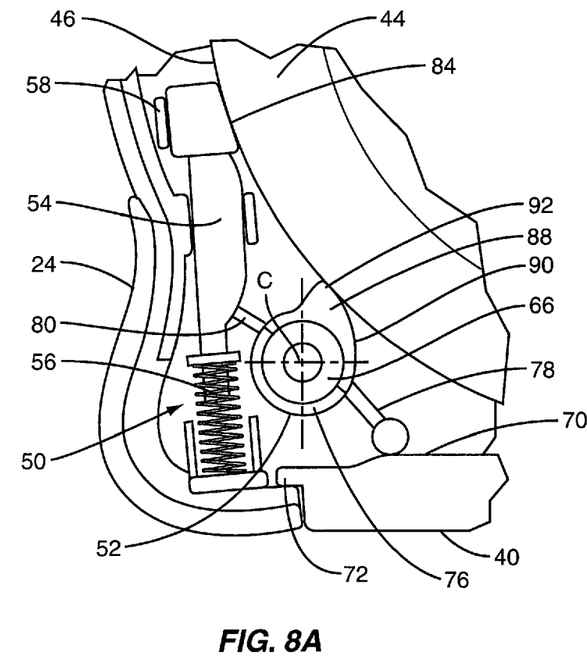
FIG. 8A shows a detail view of one embodiment of a locking mechanism in a locked state.
Figure 8B:
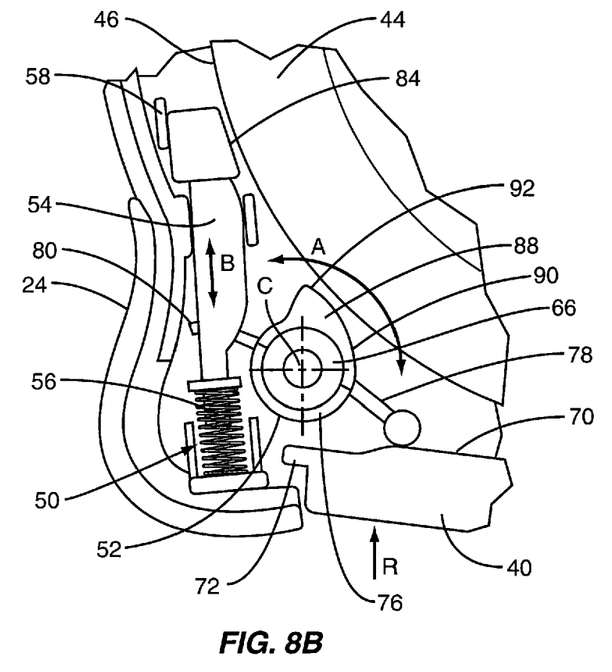
FIG. 8B shows a detail view of one embodiment of a locking mechanism in a release state.

FIGS. 3-4 depict different views of the locking mechanism 50. Specifically, FIG. 3 shows a perspective view of the lower rear corner of the tape measure 10, with the tape blade 20 slightly extended. FIG. 4 shows a side view of the tape measure with the tape blade 20 retracted. Also, FIGS. 8A-8B show a detailed representation of the locking mechanism 50 according to the DETAIL VIII callout in FIG. 4. FIGS. 8A-8B show the locking mechanism 50 in the locked and released states, respectively. In FIGS. 8A-8B, shell 22 is removed, exposing the internal workings of the tape measure 10. The blade winding drum (or "reel") 44 is rotatably mounted in the housing 12 and typically takes a commonly known bobbin-like form with two parallel flanges 46 and an intervening core (not visible). The tape blade 20 is wound about the drum 44 in a convolute coil. The inner portion of the drum 44 provides a central cavity for substantially housing retraction spring 45 (see dashed line representation in FIG. 4). The retraction spring 45 is anchored on one end to the drum 44 and at the other end to a post 48, which may be a separate member or integrally formed with the shell 24. The post 48 is generally not rotatable whereas the drum 44 is free to rotate about the post 48 and about axis D. As such, the retraction spring 45 provides a bias to retract the tape blade 20 when the locking mechanism 50 is released.

Figure 5:
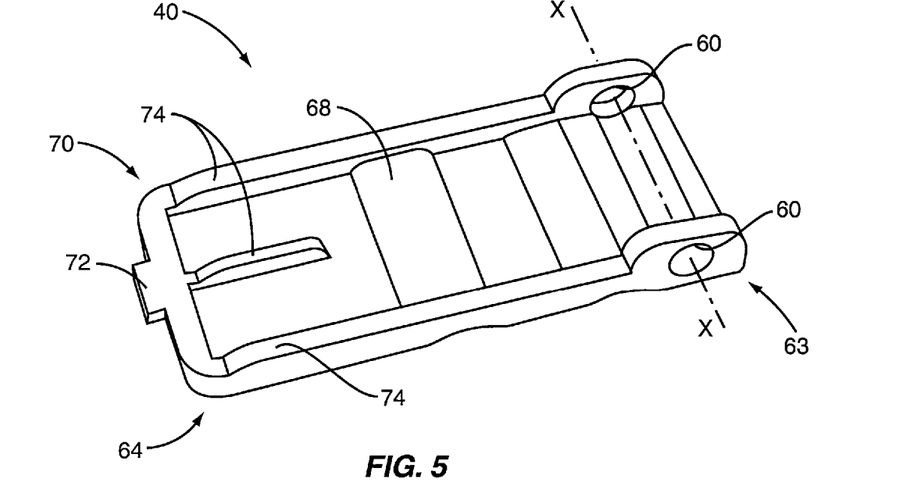
FIG. 5 shows a perspective view of one embodiment of an actuator.
Figure 6:
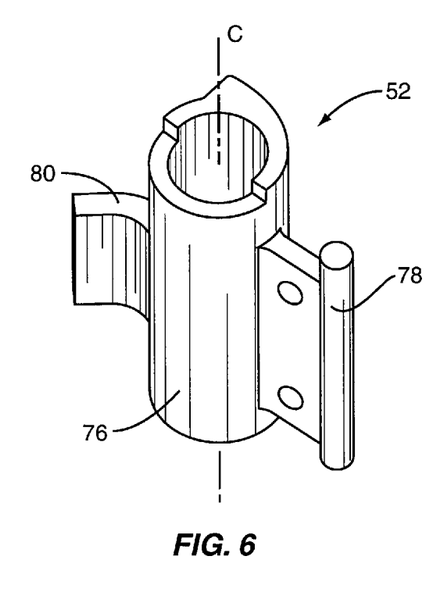
FIG. 6 shows a perspective view of one embodiment of a coupler.
Figure 7:
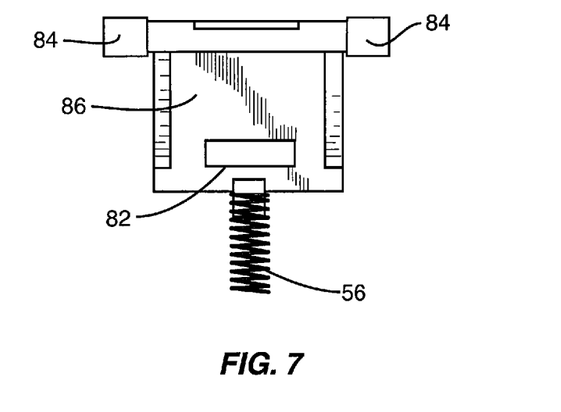
FIG. 7 shows one embodiment of a brake.

As suggested, the actuator 40 is moveably supported by the housing 12. The actuator 40 is operatively coupled to coupler 52, which in turn, is operatively coupled to brake 54. FIGS. 5-7 show respective views of the actuator 40, coupler 52, and brake 54. The brake 54 is normally disposed in contact with the drum 44. When a release force R is applied to actuator 40, coupler 52 is displaced (counter-clockwise in FIG. 4), thereby producing a corresponding displacement of brake 54 (downward in FIG. 4). The displacement that is produced as a result of applied release force R tends to move the brake 54 at least temporarily out of contact with the drum 44, thereby allowing the retraction spring 45 to retract the tape blade 20.

A biasing member 56 urges the brake 54 into contact with one or both of the drum flanges 46. In the depicted embodiment, the biasing member 56 is a coiled compression spring. Other types of biasing members may be used, including for example, leaf springs, torsion springs, and tension springs. The spring 56 advantageously urges the brake 54 into simultaneous contact with the drum 44 and the housing 12. More specifically, as shown in FIG. 3, the spring 56 may advantageously urge the brake 54 into contact with drum flanges 46 and a locking boss 58 that protrudes inwardly from peripheral wall 16 of housing 12. Note that in an alternative approach, locking boss 58 may protrude from a sidewall 14 of the housing. Alternatively, the brake 54 may be wedged between a sidewall 14 itself and the drum flanges 46. In such embodiments, brake 54 is normally wedged between drum 44 and some portion of housing 12, which prevents drum 44 from rotating in a retraction direction.

The actuator 40 may be pivotally mounted proximate bottom 42 of tape measure 10. The actuator 40 of FIG. 5 includes a generally flattened and elongated body 68, with pivot apertures 60 disposed towards the actuator's forward end 63. The pivot apertures 60 are aligned along a common pivot axis X. While two pivot apertures 60 are shown, an alternative embodiment may incorporate a single aperture extending a distance that is less than, greater than, or equal to the width of actuator 40. The pivot apertures 60 engage a corresponding pivot boss 62 that is disposed towards a forward end of housing 12 near opening 18 in each of the shells 22, 24. Of course, the male/female relationship of this connection may be reversed, as is desired. As the release force R is applied to actuator 40, the rear end 64 of actuator 40 moves inward towards drum 44. This inward displacement, in turn, causes coupler 52 to move brake 54 towards a released position. In an alternative embodiment, the actuator 40 is implemented as a push button instead of the substantially cantilevered embodiment illustrated.

As shown in FIG. 4, coupler 52 may be mounted to pivot boss 66 so as to rotate about axis C. Pivot boss 66 is disposed towards a rear of the housing 12, away from forward opening 18, and is therefore disposed rearward of the drum's rotation axis D. FIG. 6 shows a perspective view of one embodiment of coupler 52. The coupler 52 of FIG. 6 includes a cylindrical body 76 with a laterally extending first arm 78 that contacts a bearing surface 70 on actuator 40. The bearing surface 70 may be a single surface or, as shown in FIG. 5, may be comprised of multiple surfaces. In FIG. 5, three substantially parallel ribs 74 protrude from the body 68 towards the interior of the housing 12 to form the bearing surface 70. Further, the ribs 74 extend substantially parallel to one another in a direction substantially perpendicular to the pivot axis X. The first arm 78 of coupler 52 contacts bearing surface 70. Consequently, as the actuator 40 displaces inwards under the influence of a release force R, bearing surface 70 pushes first arm 78 and causes coupler cylindrical body 76 to rotate about pivot boss 66.

The coupler 52 of FIG. 6 further includes a laterally extending second arm 80 that engages brake 54. Thus, as the cylindrical body 76 rotates about pivot boss 66, the second arm 80 displaces brake 54 against the urging force provided by spring 56. Thus, application of release force R moves the brake 54 out of simultaneous contact with the housing 12 and drum 44, thereby allowing the tape blade 20 to retract into the housing 12. As release force R is removed, spring 56 tends to displace brake 54 back into simultaneous contact with drum 44 and housing 12. This once again locks the drum 44 relative to housing 12. Furthermore, the movement of brake 54 to the locked position rotates coupler 52, which in turn pushes actuator 40 outward. The actuator 40 may include a stop tab 72 that engages the housing 12 to limit the extent to which the actuator 40 is pushed outward.

The second arm 80 advantageously fits within a corresponding aperture 82 in brake 54. Further, second arm 80 may be curved slightly to maintain engagement with the brake aperture 82. At each interface (i.e., between coupler 52 and actuator 40 and between coupler 52 and brake 54), there is sliding contact between the parts, which tends to reduce the overall size of the brake mechanism 50. Further, the sliding interfaces tend to limit the extent to which motion of the parts is constrained. However, it should be noted that the interface either between coupler 52 and release lever 40 or between coupler 52 and brake 54 may take other forms, such as a ball and socket joint.

The brake 54 shown in FIG. 7 includes at least one, and advantageously a pair, of brake pads 84 that extend laterally from a brake body 86. Alternatively, the brake body 86 could be formed with a width that is equal to or greater than brake pads 84. In any event, brake pads 84 are spaced so that they align with the flanges 46 on tape drum 44. Furthermore, as shown in FIGS. 8A-8B, the brake pads 84 may be tapered or curved to better engage the curved drum flanges 46. Due to their configuration, brake pads 84 tend to become less engaged with the drum 44 when the drum 44 rotates in one direction (clockwise in FIGS. 8A-B) corresponding to the tape blade 20 being pulled out, but tend to become more engaged with drum 44 when the drum 44 rotates in the opposite direction (counter-clockwise in FIGS. 8A-B) corresponding to the tape blade 20 being retracted. The brake 54 and/or flanges 46 may be advantageously constructed from wear resistant materials such as Delrin, PTFE, or ultra-high molecular weight polyethylene. This is not to suggest that these are required materials or that some amount of wear is not advantageous. For instance, as the brake pads 84 and/or the flanges 46 wear over time, their mating surfaces may tend to conform to one another providing increased surface contact and increased locking capacity.

As indicated above, the coupler 52 includes a generally cylindrical body 76. The cylindrical body 76 is hollow and is sized to fit on pivot boss 66. In one embodiment, the cylindrical body 76 includes a substantially fixed outer diameter (excluding arms 78,80). However, in the illustrated embodiment, the cylindrical body 76 includes a cam feature 88 that protrudes outward from cylindrical body 76. The cam feature 88 extends from a first end 90 that is substantially flush with the remainder of the cylindrical body 76 towards a second end 92 that protrudes a greatest amount from the cylindrical body 76. In one embodiment, the second end 92 of cam feature 88 protrudes from the cylindrical body 76 by an amount sufficient to contact drum flange 46 when the locking mechanism 50 is locked as shown in FIG. 8A. Accordingly, when the locking mechanism 50 is locked, the coupler 52 and the brake 54 both contact a given flange 46 of the drum 44 at locations circumferentially spaced from one another, thus providing a two-point friction lock. However, once release force R is applied as shown in FIG. 8B, coupler 52 rotates as indicated by the arrow labeled A so that the second end 92 of cam feature 88 rotates out of contact with flange 46 and cam feature first end 90 rotates to face flange 46. However, because cam feature first end 90 protrudes by a smaller amount from cylindrical body 76, coupler 52 does not engage flange 46. Furthermore, as described above, coupler 52 rotation tends to pull brake 54 out of contact with flange 46. Therefore, when release force R is applied as shown in FIG. 8B, the drum 44 is free to rotate (in the clockwise direction in the views shown) to retract the tape blade 20. Note that the rotating motion A of coupler 52 tends to produce a corresponding linear motion of brake 54 as indicated by arrow B.

The brake 54 and the cam feature 88 are advantageously tapered to allow rotation of drum 44 in the extension direction while resisting rotation in the retraction direction. For instance, tapered brake pads 84 are shaped and oriented such that interference between the brake 54, the housing 12, and the drum 44 normally increases when the drum 44 rotates in the retraction direction (such as under the influence of retraction spring 45). Conversely, tapered brake pads 84 provide a decreasing interference between the brake 54, the housing 12, and the drum 44 when the drum 44 rotates in the extension direction. Generally, a similar effect is achieved by the tapered cam feature 88 on the coupler 52. That is, the cam feature 88 is advantageously shaped and oriented to provide greater resistance to rotation of drum 44 in the retraction direction, and less (or advantageously essentially none) resistance to rotations of drum 44 in the extension direction.

It is believed that the brake pads 84 and the cam feature 88 are each independently sufficient to prevent rotation of the drum 44 in the retraction direction. Therefore, in addition to the illustrated embodiments, the locking mechanism 50 may include only one of these locking features. For instance, in one embodiment, the locking mechanism 50 may include brake pads 84 on the brake 54 and no cam feature 88 on coupler 52. In an alternative embodiment, the locking mechanism 50 may include the cam feature 88 on coupler 52, with either no brake pads 84 on brake 54 or no brake 54. In such arrangements, the coupler 52 may be more properly thought of as a rotatable member 54, and may be alternatively referred to thereas. The rotatable member 54 should be biased to rotate into the engaged position, such as directly or indirectly by spring 56, or by some other means such as a torsion spring (not shown) between pivot boss 66 and body 76, a resilient connector (not shown) between pivot boss 66 and body 76, or other rotational biasing means known in the mechanical arts. Any of these alternative embodiments may be sufficient to achieve the desired auto-lock function.

Figure 9:
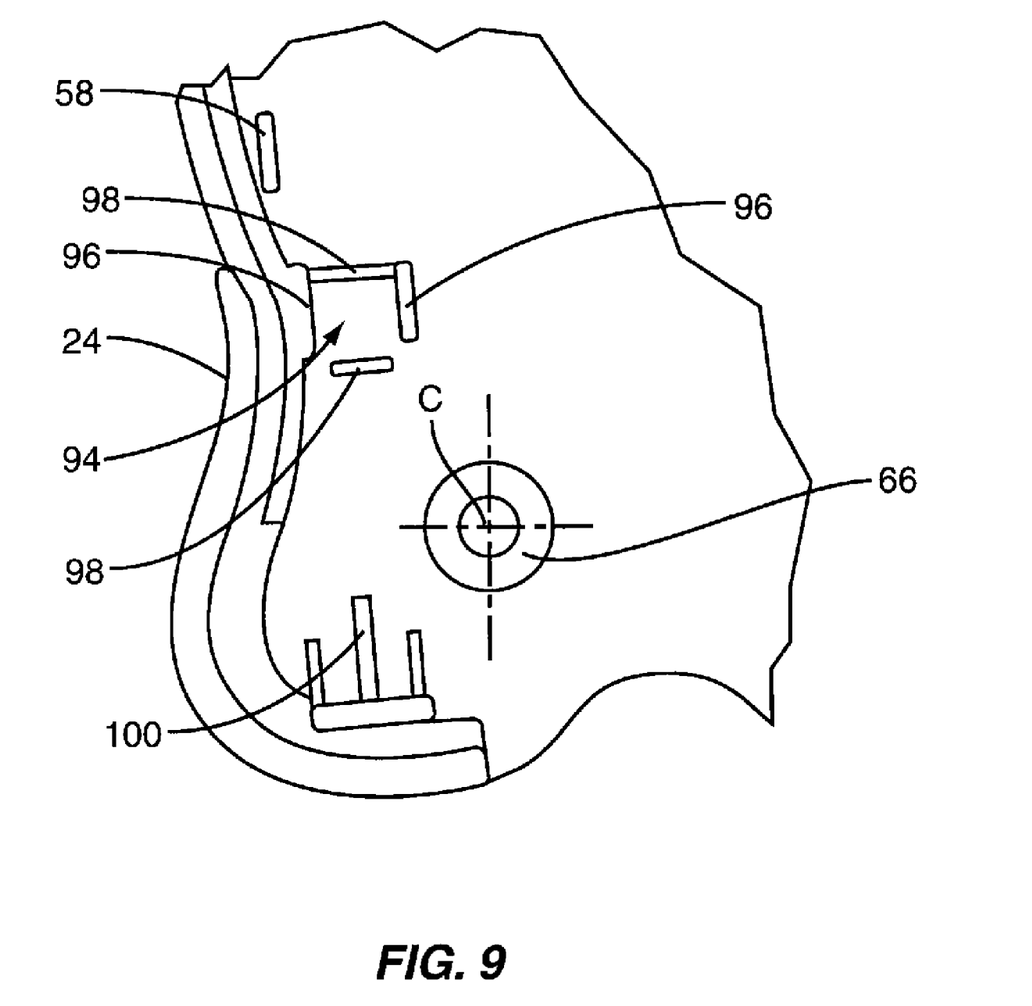
FIG. 9 shows a detail view of a portion of a tape measure housing suitable for use with the tape measure of FIG. 1.

FIG. 9 shows shell 24 with locking mechanism 50 and drum 44 removed for clarity, and illustrates exemplary geometry within the tape housing 12 that may be used to secure the various components of the locking mechanism 50. Generally, each of the mating shells 22, 24 may include similar geometry, mirrored about the center plane of housing 12, perpendicular to axis D. The pivot boss 66 onto which coupler 52 is installed is located proximate to brake channel 94. The brake channel 94 may be formed as a slot in which the brake 54 resides and moves. However, in the embodiment shown, opposed channel bosses 96,98 form the brake channel 94 to limit the range of motion for the brake 54. A first set of channel bosses 96 limits forward and backward motion, but permit up and down motion of the brake 54. Similarly, the second set of channel bosses 98 limits lateral motion, but also permit up and down motion of the brake 54. As suggested, these bosses 96,98 cooperate with corresponding bosses in the unillustrated mating shell 22 to further constrain the motion of the brake 54. The tape housing 12 also includes a seat 100 for spring 56. The seat 100 may be formed as a post, a recess, a hook, or other retaining feature intended to constrain spring 56. The seat 100 further provides resistance against which spring 56 can urge brake 54 into contact with drum 44 and locking boss 58.

It should be understood that the tape measures 10 of the present invention may also include other features, such as shock-absorbing bumpers proximate the opening 18, specially coated blades, reinforced hooks, and like, all of which are known in the art.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A tape measure, comprising:
an external housing;
a tape drum rotatably disposed in said housing and having a tape measure blade at least partially coiled thereon, the tape drum biased to retract the tape measure blade into the housing;
an externally accessible actuator moveably supported by the housing;
a coupler rotatably disposed within the housing;
a brake element operatively coupled to the coupler;
the actuator, the coupler, and the brake element being distinct members;
a biasing member normally urging the brake element into wedged contact with the tape drum to prevent the drum from rotating in a retraction direction;
the actuator displaceable relative to the housing to cause the coupler to rotate about an axis thereof and thereby move the brake element out of wedged contact with the tape drum to thereby enable the drum to rotate in the retraction direction.

2. The tape measure of claim 1 wherein the brake element is normally urged by the biasing member into wedged contact between the tape drum and the housing.

3. The tape measure of claim 2 wherein the housing comprises an inwardly extending boss, and wherein the brake element is normally urged by the biasing member into wedged contact between the tape drum and the boss.

4. The tape measure of claim 1 wherein a first end of the actuator is pivotally coupled to the housing and a second end of the actuator is displaceable towards the interior of the housing to rotate the coupler.

5. The tape measure of claim 1 wherein the actuator is recessed relative to a bottom surface of the housing.

6. The tape measure of claim 1 wherein the tape drum rotates about a drum rotation axis and the housing includes a front opening through which the tape blade extends from the housing, and wherein the brake element is disposed at a rear portion of the housing, anterior to the drum rotation axis and distal from the opening.

7. The tape measure of claim 1 wherein the coupler includes a first arm and a second arm, the first arm contacting the actuator and the second arm contacting the brake element.

8. A power-return tape measure comprising:
a housing;
a tape drum rotatably disposed in the housing and having a tape measure blade at least partially coiled thereon, the tape drum biased to retract the tape measure blade;
an externally accessible actuator moveably supported by the housing;
a coupler rotatably disposed within the housing, the coupler including a cammed outer surface;
a brake element operatively coupled to the coupler;
the actuator, the coupler, and the brake element being distinct members;
a biasing member normally urging the coupler and the brake element toward a first locked position in which the brake element and the cammed outer surface contact the tape drum;
the actuator displaceable relative to the housing to rotate the coupler and thereby move the coupler and the brake element to a second release position in which the brake element and the cammed outer surface are spaced from the tape drum.

9. The tape measure of claim 8 wherein the coupler includes a first arm and a second arm, the first arm contacting the actuator and the second arm contacting the brake element.

10. The tape measure of claim 8 wherein the brake element and the cammed outer surface contact the tape drum at respective first and second points disposed rearward of a tape drum rotation axis and away from a forward opening in the housing through which the tape blade extends.

11. The tape measure of claim 8 wherein a first end of the actuator is pivotally coupled to the housing and a second end of the actuator is displaceable towards the interior of the housing to rotate the coupler.

12. The tape measure of claim 8 wherein the brake element moves in a direction between the locked and release positions that is substantially perpendicular from a direction that the tape blade extends from the housing.

13. A power-return tape measure comprising:
a housing with first and second sidewalls and a peripheral wall extending therebetween;
a tape drum rotatably disposed between said first and second sidewalls and having a tape measure blade at least partially coiled thereon, the tape drum being biased to retract the tape measure blade;
an externally accessible actuator moveably supported by the housing having a first end portion and a second end portion, the first end portion pivotally coupled to the housing and the second end portion inwardly displaceable relative to the housing;
a coupler rotatably disposed within the housing, the coupler including a first arm and a second arm, the first arm extending towards the actuator;
a brake element operatively coupled to the second arm and moveable within the housing generally perpendicular from a direction that the tape blade extends from the housing;
the actuator, the coupler, and the brake element being distinct members;
a biasing member normally urging the brake element into contact with the tape drum to disable tape blade retraction;
wherein inward displacement of the actuator causes the coupler to rotate and the second arm to thereby move the brake element out of contact with the tape drum to enable tape blade retraction.

14. The tape measure of claim 13 wherein the brake element is disposed rearward of a tape drum rotation axis and distal from a forward opening through which the tape blade extends from the housing.

15. The tape measure of claim 13 wherein the brake element is normally urged by the biasing member into wedged contact between the tape drum and the housing.

16. The tape measure of claim 13 wherein the brake element remains spaced from the tape blade when the brake element engages the tape drum.

17. A method of assembling a tape measure, comprising:
providing a main case including an outer shell;
rotatably disposing a drum in the case, the drum including a tape blade at least partially coiled thereon;
biasing the drum to rotate in a retraction direction to retract the tape blade from an extended position;
wedging a brake element against the drum to prevent drum rotation in the retraction direction;
coupling the brake element to a user-displaceable actuator that is movably supported by the main case,
inwardly displacing the actuator to thereby cause the brake element to move to a release position where the brake element is not wedged against the drum so that the blade may be retracted into the housing.

18. The method of claim 17 wherein coupling the brake to the user-displaceable actuator comprises linking a distinct rotating coupler between the actuator and the brake element.

19. The method of claim 18 wherein said inwardly displacing the actuator further comprises disengaging a cammed portion of the coupler from the drum.

20. The method of claim 17 wherein the brake element remains spaced from the tape blade both when wedged against the drum and when in the release position.

21. A method of assembling a tape measure, comprising:
providing a main case including an outer shell;
rotatably disposing a drum in the case, the drum including a tape blade at least partially coiled thereon;
biasing the drum to rotate in a retraction direction to retract the tape blade from an extended position;
selectively preventing drum rotation in the retraction direction by wedging a brake element against the drum at a first location and contacting the drum with a cammed member at a second location circumferentially spaced from the first location;
coupling the brake element and the cammed member to a user-displaceable actuator that is movably supported by the outer shell;
wherein an inward displacement of the actuator causes each of the brake element and the cammed member to move to a release position out of contact with the drum.

22. The method of claim 21 further comprising applying a resilient biasing force to normally urge the brake element and the cammed member into contact with the drum.

23. The method of claim 21 wherein moving each of the brake and the cammed member to the release position out of contact with the drum comprises rotating the cammed member and moving the brake element generally tangentially to a peripheral edge of the drum.

24. The tape measure of claim 1 wherein the coupler comprises a cammed outer surface shaped to provide an increasing interference between the cammed outer surface and the drum upon rotation of the drum in the retraction direction.

25. The tape measure of claim 1 wherein the brake element comprises a brake pad shaped to provide an increasing interference between the brake pad and the drum upon rotation of the drum in the retraction direction.

26. A power return tape measure comprising:
a housing with first and second sidewalls and a peripheral wall extending therebetween;
a tape drum rotatably disposed between said first and second sidewalls and having a tape measure blade at least partially coiled thereon, the tape drum rotatable in an extension direction to extend the tape measure blade from the housing and biased to rotate in a retraction direction to retract the tape measure blade;
braking means for applying a friction force against the tape drum so as to prevent drum rotation in the retraction direction, without contacting the tape blade; and
means for selectively releasing the braking means to permit drum rotation in the retraction direction.

27. The tape measure of claim 26 wherein the braking means further provides an increasing interference against rotation of the tape drum in the retraction direction.

28. The tape measure of claim 27 wherein the braking means further provides a decreasing interference against rotation in the extension direction.

29. The tape measure of claim 26 wherein the braking means applies a friction force against the tape drum at a first location, and wherein the tape measure further comprises a cam selectively engaging the tape drum at a second location circumferentially spaced from the first location.

30. The tape measure of claim 1 wherein the brake element is shaped to provide a decreasing interference between the brake element and the drum upon rotation of the drum in an extension direction.

* * * * *